United States Patent [19]

Watanabe

[11] 4,404,668

[45] Sep. 13, 1983

[54] SOUND REPRODUCING DEVICE

[75] Inventor: Katsumi Watanabe, Kawasaki, Japan

[73] Assignee: Ozen Corporation, Tokyo, Japan

[21] Appl. No.: 279,618

[22] Filed: Jul. 1, 1981

[30] Foreign Application Priority Data

Mar. 17, 1981 [JP] Japan .................................. 56-38244

[51] Int. Cl.³ ...................... G11B 17/00; A63H 3/33; G11B 3/00

[52] U.S. Cl. ........................................ 369/65; 369/31; 369/67

[58] Field of Search .............................. 369/65, 67, 31

[56] References Cited

U.S. PATENT DOCUMENTS 3,782,732 1/1974 Summerfield .......................... 369/31
3,799,556 3/1974 Watanabe .............................. 369/31
4,150,831 4/1979 Watanabe .............................. 369/31

Primary Examiner—Steven L. Stephan
Attorney, Agent, or Firm—Basile, Weintraub & Hanlon

[57] ABSTRACT

In order to perform selective sound reproduction from a plurality of recorded grooves on a record disc, a stopper block for stopping a record disc at a position where starting point of the record disc is able to engage the reproduction stylus of a pickup is disposed on the reverse side of the record disc. A plurality of locking bars corresponding to the number of recorded grooves are distributed along a circle concentric with the record disc and the circle has a radius smaller than the radius of the record disc.

The locking bars are urged by a flat spring having radial teeth fixed around a shaft holder for receiving the center shaft toward direction, and are normally held by the spring apart from the stopper block. The center shaft as a center of rotation of the record disc is normally biased by a spring toward retracted direction and engages the locking bars through a manipulating member. One of the locking bars urges the manipulating member affixed to the center shaft by pushing thereon against the resilient force imparted by the flat spring. In turn the center shaft pushes a sound transmitting member upward and releases stylus force applied to pickup to allow the pickup to return by a return spring to the starting point of sound reproduction. Prior to the engagement of the center shaft and the sound transmitting member, the locking bar projects into the rotational plane of the stopper block and engages with the stopper block such that the record disc is temporarily stopped.

4 Claims, 5 Drawing Figures

SOUND REPRODUCING DEVICE

BACKGROUND OF THE INVENTION

1. Field of the Invention

The present invention relates to a sound reproducing device and, more particularly, to a sound reproducing device for selectively playing any desired one groove among a plurality of recorded grooves.

According to the present invention, a locking block or stopper arm is disposed on the side surface of a record disc for temporarily stopping the record disc at a position where a sound reproduction stylus is resting on the starting point of sound reproduction and able to select any specific record groove disposed at the reverse side of the record disc.

On the other hand, a plurality of locking bars or locking rods which advance into the plane of rotation of the stopper arm and stop the stopper arm are disposed within a radial distance from the center of the record disc smaller than the radius of the record disc.

By virtue of these structureal features, the device of the present invention, as a whole, is reduced in plan size as small as possible so as to expand it's field of application and is simplified in its mechanism for returning a pickup by manipulation of the locking spindle which thereby facilitates ready assembly and assures a strong construction.

2. Description of the Prior Art

Among various kind of sound reproducing devices, there are devices of simplified construction intended to be incorporated into dolls or toys which are capable of selecting any desired recorded groove among the plurality of grooves recorded on a record disc. The device disclosed by the present inventor's prior invention granted as Japanese Pat. No. 846861, published as Japanese Patent Publication No. 19763/76, can be raised as a most typical example of this kind of device.

According to the aforesaid prior art device, a stopper arm attached to the record disc is arranged to project outwards at the outer periphery of the record disc. Accordingly, locking bars or mating members are be disposed outside of the outer periphery of the record disc so as to encompass the record disc.

Due to this construction, the casing of the device must have a space for arranging such locking bars or rods around the record disc, so it must have a larger diameter with sufficient clearance from the side face of the record disc than where the device has no locking bar or locking spindle.

This is liable to extend the plan size of the device such that it becomes difficult to incorporate such a device into certain articles, such as dolls or toys.

Furthermore, since the locking bars or rods are disposed around the outer periphery of the record disc, it was indispensable for effecting return of the pickup to the starting point of sound reproduction by manipulating the locking bars to dispose a plurality of cam means on an annular ring member rotatably attached to a center shaft such that the cam means can engage the locking bars.

However, such a mechanism and arrangement of cam means necessitated a highly skilled manufacturing technique and accompanying increased costs, complicated construction, greater actuating power, and yet lowered the strength of the device.

SUMMARY OF THE INVENTION

The present invention aims to obviate various drawbacks of the prior art devices mentioned above.

One object of the present invention is to lessen the expansion in plan size of a simplified sound reproducing device of the selective reproduction type to thereby expand its range of applicability.

Another object of the present invention is to simplify the construction of a sound reproducing device capable of selective sound reproduction, and yet reduce production costs and further improve the strength of the device as a whole.

A further object of the present invention is make the operation of selection sound reproduction more ready and smooth.

In order to achieve the above-mentioned objects, a locking piece or block, more specifically, a stopper arm, for stopping the record disc at a position where the starting point of sound reproduction of a selected groove is able to engage the reproduction stylus, is disposed at the reverse side of the record disc.

A plurality of locking bars corresponding to the number of recorded grooves are distributed along a circle concentric with the record disc which has a radius smaller than that of the record disc.

Consequently, the entire device can be made compact, particularly in its width such that the device can be readily incorporated into an article of small width such as doll or the like.

Moreover, as the device is constructed for actuation in which a radially extending manipulating member is pushed by one of said locking bars to thereby to advance a center shaft which, in turn, urges a sound transmitting member to release the stylus force applied to the pickup, motion of the pickup at the starting point of sound reproduction can be effected very smoothly by the manual pushing of one of the locking bars. Also the manipulation mechanism necessary for selective reproduction of the desired record groove can be rendered very simple.

DETAILED DESCRIPTION OF A PREFERRED EMBODIMENT

Figure 1:
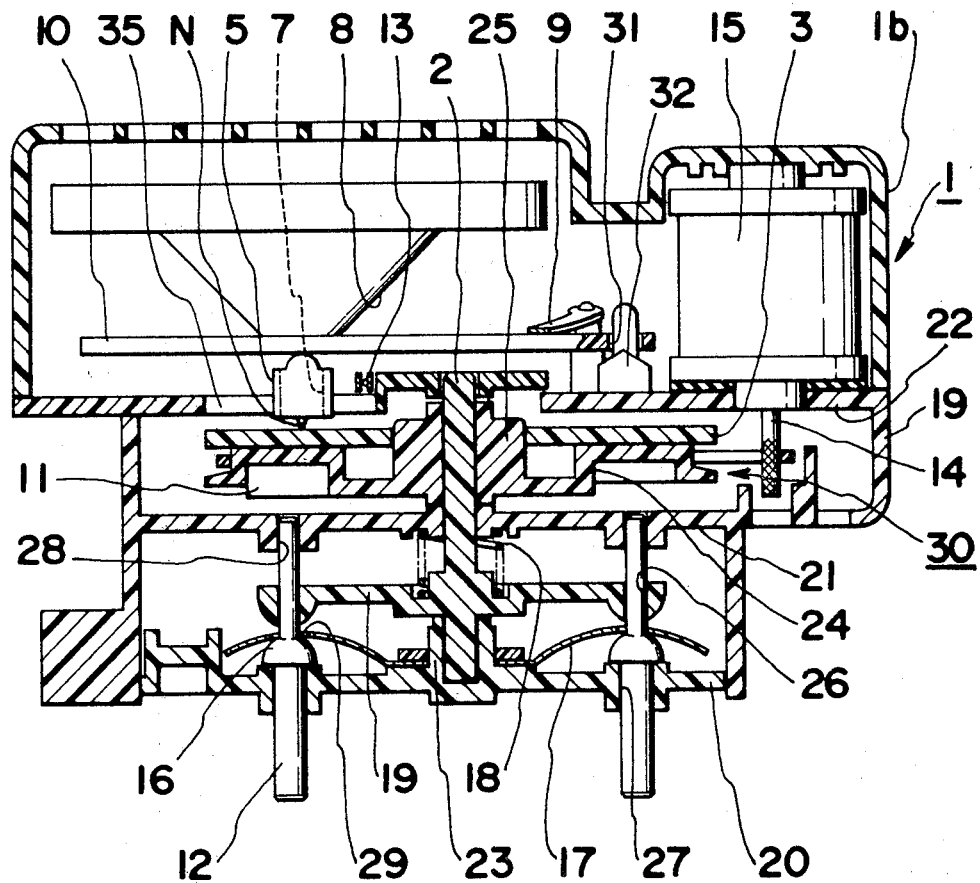
FIG. 1 is an elevational cross-sectional view of one example of the present invention.

As shown in FIG. 1, a casing 1 and 3 consists of a chassis 1a and a housing 1b. The chassis 1a has a rear lid 20 inserted therein and a middle deck 21 and a front deck 22 both are integrally formed with the chassis.

At the center part of the chassis 1a, there is disposed a center shaft 2 received by a cylindrical thrust holder 23 integrally formed at the center part of the rear lid 20.

The center shaft 2 is reciprocally movable such that its tip end can project beyond the upper surface of the front deck 22.

A record disc 3 is disposed between the front deck 22 and the middle deck 21 and is freely rotatable with respect to the center shaft 2. The record disc 3 is supported at its back face on a turn table 24 and on the side surface of a boss 25 integrally formed at the center part of the turn table 24 the record disc is held frictionally and firmly against both rotational and axial movement.

Figure 5:
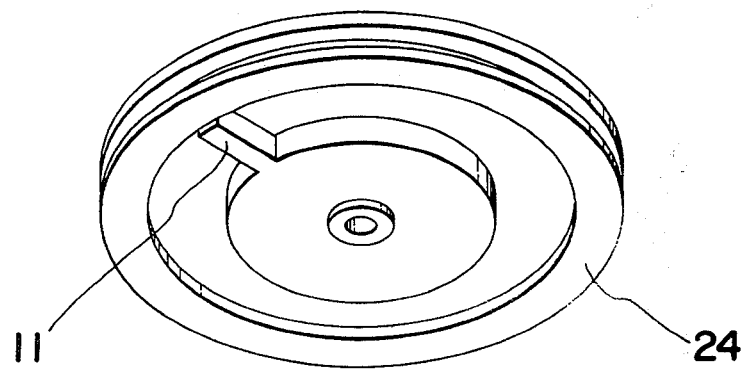
FIG. 5 is a perspective view of a turn table.

The turn table 24 is disposed such that the boss 25 is held between the front deck 21 and middle deck 22 so as to be restrained from axial movement. As also shown in FIG. 5, at the reverse side of the turn table, a locking piece, or in other words, a radially extending stopper arm 11 is provided.

The peripheral rim of the turn table 24 has an annular flange which, together with the back surface of the record disc, constitutes a grooved pulley.

Figure 2:
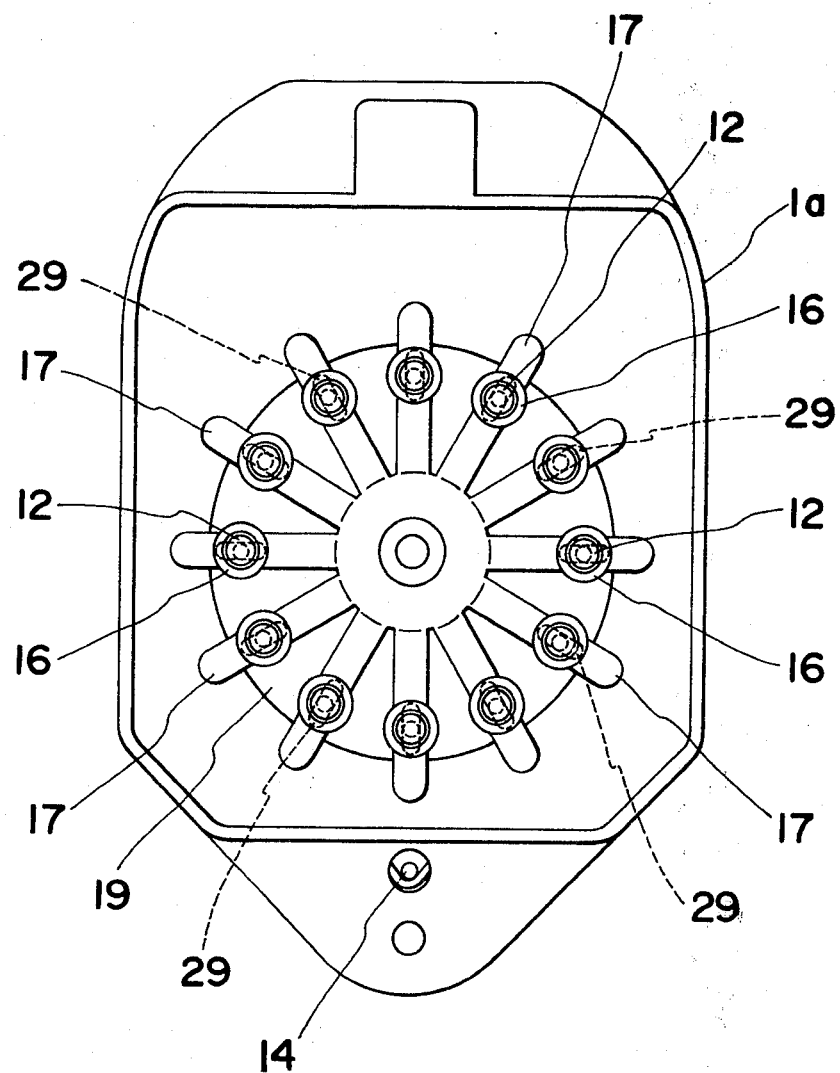
FIG. 2 is a plan view of a rear lid portion having been removed from the casing.

As shown in FIGS. 1 and 2, the center shaft 2 has an integrally formed manipulating member 19 which is shaped in a circular disc configulation and has twelve through holes 26 formed therein.

A compression coil spring 18 is disposed in a compressed state between the back face of the middle deck 21 and the manipulator member or disc 19 such that the center shaft is normally urged to its retracted position.

Holes 27 and 28 of equal numbers corresponding to the twelve holes 26 in the manipulator disc 19 are provided, respectively, in the rear lid 20 and the middle deck 21.

Locking bars 12 are disposed in such a manner that each of them extends through each corresponding holes 27, 26 and 28, and each of the locking bars 12 has a flange 16 at the middle part. A toothed flat spring 17 having twelve radially extending teeth is fixedly attached around the thrust holder 23 of the center shaft 2.

Near the tip end of each tooth of the flat spring 17, an oblong slot 29 is formed through which the forward portion of each locking bar 12 passes such that each tooth of the spring seats thereon and urges the locking bar 12 toward the direction of its retracted position.

The shape of the toothed flat spring 17 and the slots 29 are clearly shown in FIG. 2.

Accordingly, each of the locking bars 12 can be advanced when it is pushed forward against the resilient force imparted by the toothed flat spring 17.

The locking bar 12 further urges, at the flange 16, the manipulating disc 19 to move forward to thereby advance the center shaft 2 against the resilient force imparted by the coil spring 18. At the same time, the tip end of each locking bar advances beyond the forward end face of the hole 28 such that it can engage the side face of the locking piece or stopper arm 11.

The manipulating disc 19 has a circular form, as mentioned before, the diameter of which is smaller than that of the record disc 3. Similarly, the overall diameter of the flat spring 17 having a plurality of radially extending teeth is made smaller than the diameter of the record disc 3. And yet, all of the holes 26, 27 and 28 for receiving the corresponding locking bars 12 therethrough are disposed along a concentric circle having a radius smaller than that of the record disc 3.

Figure 4:
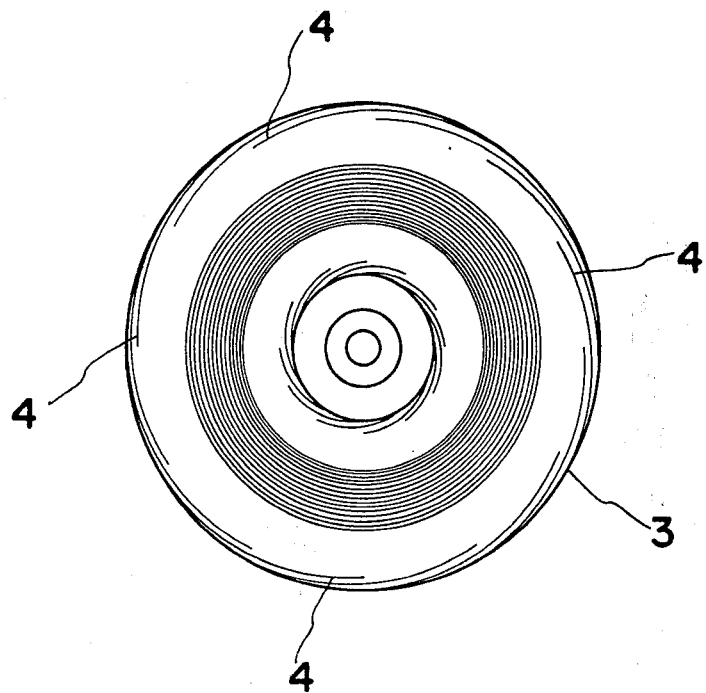
FIG. 4 is a plan view of a record disc.

As can be seen in FIG. 4, the record disc 3 is formed with twelve recorded grooves 4, which corresponds to the number of the aforesaid locking bars which can be varied in numbers depending on the number of recorded grooves.

Figure 3:
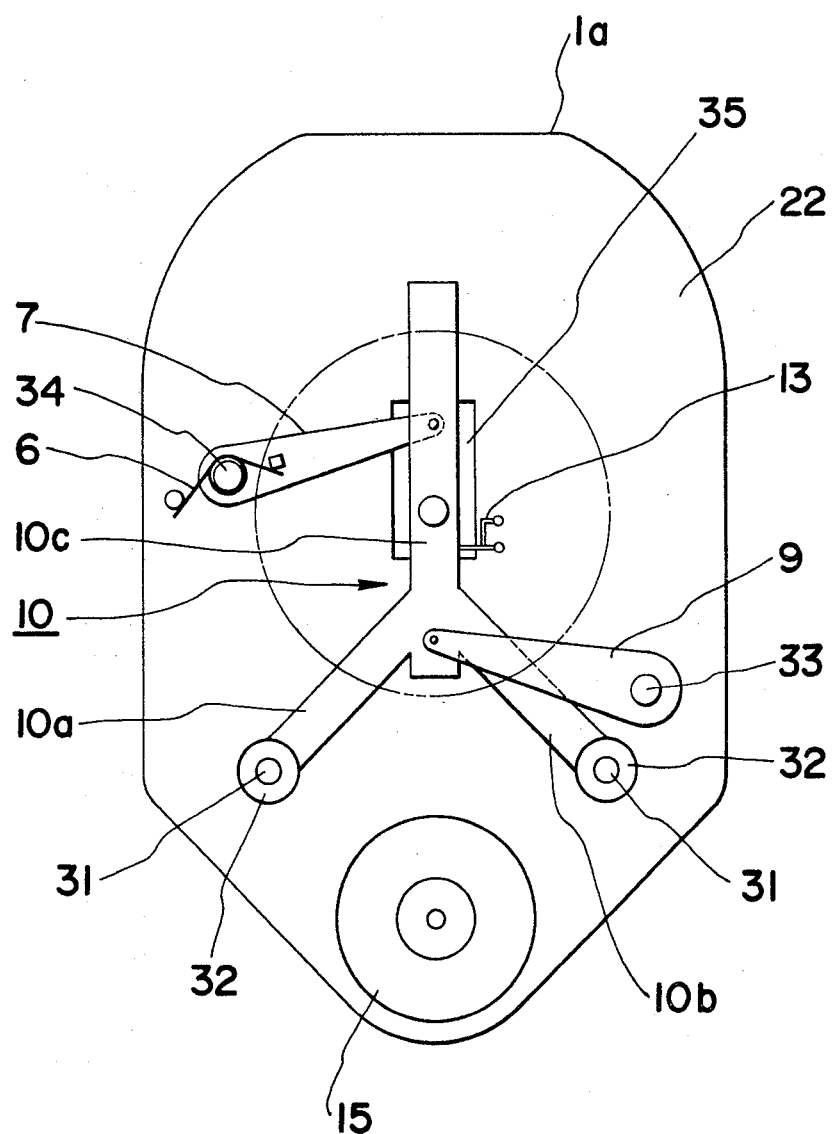
FIG. 3 is the plan view of a chassis portion having been removed from assembly with the housing.

As shown in FIGS. 1 and 3, the front deck 22 of the chassis 1a carries a tone arm 7 including a pickup 5, a speaker cone 8, a sound transmitting member 10 carrying the speaker cone 8, an electric motor 15 for driving the record disc, an electric switch 13 for connecting or interrupting the connection between the motor 15 and a power switch and a stylus force spring 9.

The motor 15 has an output shaft 14 which extends from the front deck 22 toward the middle deck 21 and faces the side periphery of the turn table 24.

A frictional power transmission means 30 such as a resilient belt is extended between and around the pulley groove formed on the turn table 24 and the output shaft 14 so as to frictionally connect the record disc 3 and the output shaft 14 of the motor 15.

As clearly shown in FIG. 3, the sound transmitting member 10 has a configuration as a whole, like a capital letter Y, consisting of a pair of fixing arms 10a, 10b and a body portion 10c on the upper surface of which the speaker cone 8 is adhesively attached. A pair of fixing apertures 31 are opened, respectively, on the tip end portion of each fixing arm 10a and 10b.

On the front deck 22, a pair of upstanding holding posts 32 are provided, the forward tip ends of which having a reduced diameter are inserted into and pass through said pair of apertures 31 so as to swingably receive the pair of fixing arms 10a and 10b.

Thus, the body portion 10c is mounted for swingable oscillation's approaching or moving away from the recorded face of the record disc 3.

The stylus force spring 9 also is firmly held about the tip end of a supporting post 33 by means of a threaded nut or the like.

A free end of the stylus force spring 9 abuts the junction of the two arms 10a and 10b of the sound transmitting member 10. Thus, the body portion 10c of the transmitting member 10 is biased toward the recorded face of the record disc 3.

On the front deck 22, an upstanding post 34 is disposed, around which an end of the tone arm 7 is inserted so that the pickup carried thereon is capable of being swung in two ways, one along the face of the record disc between the starting point and the end point of sound reproduction and the other approaching or moving away from the recorded face of the record disc.

The pickup 5 slidably engages the lower face of the sound transmitting member 10 so that the pickup can be resiliently urged by the latter toward the recorded face of the record disc.

An aperture 35 is opened in the front deck 22 of the chassis 1a to permit an entire range of swing motion of the pickup. Through the opening 35, the reproduction stylus N of said pickup is able to engage the recorded face of the record disc 3 and a necessary stylus pressure can be imparted to the stylus N through the sound transmitting member 10.

A switch denoted by reference number 13 in FIGS. 1 and 3 consists of a fixed contact and a movable contact and is positioned at the end point of sound reproduction, where the pickup upon its arrival at the end point urges the movable contact to move away from the fixed contact and thereby open the switch 13.

When the pickup starts its movement away from the end point of sound reproduction, the movable contact is released from holding action by the pickup 5 and engages the fixed contact to close the switch.

The switch 13 is placed in a power source circuit with the electric motor 15.

Now, operation of the working example of the above-mentioned device will be explained.

Assume now that pickup 5 rests on the end point of sound reproduction and the switch 13 is kept OFF.

Pushing of one of the locking bars 12 selected for next playing will let its flange 16 push manipulating disc 19. At the same time the tip end of the locking bar 12 will advance upto the position where it crosses the rotational path or plane of the stopper arm 11.

The manipulating disc 19, when pushed, will let the integrally formed center shaft 2 advance against the resilient force imparted by the coil spring 18 such that the tip end of the center shaft 2 will push the sound transmitting member 10 against the biasing force of the stylus force spring 9.

Thus the sound transmitting member 10 swings away from the pickup 5 so that the pickup 5 can be released from the stylus force applied thereto. This gives rise to a returning of the pickup 5 by a return spring 6 to the point of sound reproduction.

At the moment when the pickup 5 moves away from the starting point of sound reproduction, the switch 13 turns ON to cause the motor 15 to start rotation, which in turn, rotates the turn table 24 together with the record disc 3.

Since the tip end of the locking bar has already been projected to engage the rotating side face of stopper piece or arm 11, the turn table 24 together with the record disc are caused to temporarily stop in spite of the driving force given by the motor 15.

During this time the motor 15 still continues its rotation, consequently there takes place a temporary slippage between the pulley groove on the turn table 24 and the frictional transmission means 30.

The record disc 3 has been stopped at a position determined by the specific locking bar 12 which has already been pushed by the operator so that the specific recorded groove 4 selected for next playing can engage the reproduction stylus N of the pickup 5.

When the selected locking bar 12 is released from being pushed, it will return to it's initial position by the force of the toothed flat spring 17 accompanying the returning of the center shaft 2 by the coil spring 18. This will release the sound transmitting member 10 from its holding by the center shaft 2 such that a necessary stylus force is given to the sound reproduction stylus N. Also the locking bar 12 will take off from the engagement with the side face of the stopper arm 11, which is released from its stopping by the locking bar 12 and begins to rotate the turn table 24 and record disc 3 together and results in engagement of the specific recorded groove 4 with the sound reproduction stylus N.

According to this embodiment of the present invention, the device, as a whole, can be made compact and enables smooth manipulation in selecting the recorded groove to be played next.

What is claimed is:

1. A sound reproduction device comprising:
a casing;
a record disc disposed in the casing, the record disc having a recorded face with starting and end points of sound reproduction;
a thrust holder formed in the casing;
a center shaft movably held by the thrust holder and capable of advancing and retracting along its longitudinal axis;
means for normally biasing the center shaft toward its direction of retraction;
the record disc being rotatably supported by the center shaft;
a tone arm having forward and rearward ends, the tone arm being swingably supported at the rearward end on the casing;
return spring means mounted on the casing for normally biasing the tone arm away from the recorded face of the record disc and toward the starting point of sound reproduction;
a pickup carried on the forward end of the tone arm, the pickup being positioned for engagement with the recorded face of the record disc and capable of being swung between the starting and end points of sound reproduction;
a sound transmitting member slidably engageable with the pickup;
a speaker carried by the sound transmitting member;
a stylus force spring acting on the sound transmitting member for urging the sound transmitting member and the pickup engaged therewith into engagement with the recorded face of the record disc with predetermined stylus force;
a stopper member rotatable with the record disc, the stopper member being located adjacent to the face of the record disc opposite from the recorded face;
a plurality of locking bars, each independently manipulatable from outside of the casing, the locking bars being arranged in a circle about the center shaft and being capable of advancing into the plane of rotation of and engaging the stopper member so as to cause the stopper member to temporarily stop rotation of the record disc and retracting from the stopper member to permit rotation of the record disc;
means for biasing the locking bars toward a retracted position;
each locking bar having a projection formed thereon;
a manipulating member radially extending from and fixed to the center shaft; the manipulating member being engageable with the projections on the locking bars so as to be movable with advancing of the locking bars, the manipulating member, upon movement, causing advancing of the center shaft;
one end of the center shaft being engageable with the sound transmitting member upon advancing such that the sound transmitting member advances away from the recorded face of the record disc to release stylus force from the pickup;
an electric switch switchable to a closed state as the pickup moves away from the end point of sound reproduction;
an electric motor for rotating the record disc, the electric motor being connectable to a power source through the electric switch;
the electric motor having an output shaft; and
frictional engagement means for connecting the output shaft of the motor to the record disc.

2. The sound reproducing device as claimed in claim 1 wherein;
the record disc includes a plurality of recorded grooves;
the locking bars are provided in a number corresponding to the number of recorded grooves, and wherein
each of the locking bars being associated with one recorded groove and, when engaging the stopper member, causes temporary stoppage of rotation of the record disc so as to enable the pickup to selectively engage the starting point of sound reproduction of the recorded groove associated with the selected locking bar.

3. The sound reproducing device as claimed in claim 1, wherein one end of each locking bar projects outside of said casing for enabling manipulation.

4. The sound reproducing device as claimed in claim 2, wherein said means for biasing said locking bars is fabricated of a flat spring having a plurality of teeth corresponding to the number of said locking bars, said spring being fixed around said thrust holder of said center shaft and said locking bars are assembled to said spring by passing through an aperture formed in each tooth of said spring such that said teeth seat on said projection at the inner periphery of aperture; said manipulating member being formed of a disc integral with said center shaft and having a plurality of apertures corresponding to the number of said locking bars formed along a circle coaxial to said center shaft that said locking bars pass through said apertures in said manipulating member to engage said stopper block.

* * * * *